United States Patent [19]

Mancusi, III et al.

[11] Patent Number: 5,189,196
[45] Date of Patent: Feb. 23, 1993

[54] NEUTRALIZATION OF POLYAKYLENE CARBONATE POLYOLS FOR POLYURETHANE PREPOLYMER SYNTHESIS

[75] Inventors: Anthony W. Mancusi, III; Samuel J. Washington, both of Baton Rouge, La.

[73] Assignee: The Dow Chemical Company, Midland, Mich.

[21] Appl. No.: 749,487

[22] Filed: Aug. 15, 1991

Related U.S. Application Data

[63] Continuation of Ser. No. 14,954, Feb. 17, 1987, abandoned.

[51] Int. Cl.$^5$ ............................................. C07C 68/08
[52] U.S. Cl. ................................................... 558/261
[58] Field of Search ........................................ 558/261

[56] References Cited

U.S. PATENT DOCUMENTS

| | | | |
|---|---|---|---|
| 3,770,793 | 11/1973 | Sherr | 558/261 |
| 4,338,429 | 7/1982 | Serini et al. | 558/261 X |
| 4,448,727 | 5/1984 | Factor et al. | 558/261 |
| 4,528,364 | 7/1985 | Prier | 558/261 X |
| 4,533,729 | 8/1985 | Newland et al. | 558/261 X |

FOREIGN PATENT DOCUMENTS

| | | | |
|---|---|---|---|
| 93550 | 11/1983 | European Pat. Off. | 558/261 |
| 4-37810 | 11/1971 | Japan | 558/261 |

*Primary Examiner*—Arthur C. Prescott

[57] ABSTRACT

A prepolymer stabilization process for polyalkylene carbonate polyols includes the steps of adding a small quantity of an organosulfonic acid with stirring until base neutralization is achieved. One measure of base neutralization is a negative CPR, a test relating to controlled polymerization rate.

16 Claims, No Drawings

NEUTRALIZATION OF POLYAKYLENE CARBONATE POLYOLS FOR POLYURETHANE PREPOLYMER SYNTHESIS

This is a continuation of application Ser. No. 014,954 filed Feb. 17, 1987, now abandoned.

BACKGROUND OF THE DISCLOSURE

Polyurethanes come to mind first when one thinks of foam products, and indeed polyurethanes dominate the solid foam market. Such foams may be either rigid or flexible, depending on how the manufacture takes place. In fact, polyurethane systems allow enormous variations in the polymerization and fabrication processes; it is this complexity which keeps the urethane area a fertile field for development and expansion.

Like many macromolecules, polyurethanes are a general class of materials which can be prepared via many different routes—at least in principle. However, industrial practicalities dictate a preferred approach based on feedstock availability, ease of processing, etc. For example, ordinary condensation polymerization of bischloroformates with diamines will yield polyurethanes, but the universal large scale practice calls for condensation of diisocyanates with diols. (More generally the common synthesis involves diisocyanates and polyols—of which the diol is a special case—where triol species produce crosslinking.) A typical instance might have 2,4-toluene diisocyanate (TDI) reacting with 1,4-butanediol. In any case, the practical problems show up not at the level of individual chemical molecules but rather with the physical production and molding steps.

Polyurethanes are notoriously defiant regarding fabrication. The production of a good, useful foam object involves precise control over the size and distribution of the hollow voids, or cells in the product. An open cell foam would make a poor life preserver while a closed cell foam would make a poor sponge. Volumes have been written on the problems associated with polyurethane processing, and the subject is generally beyond the scope of this discussion, except as relates to prepolymer stabilization.

Most polyurethanes cannot simply be made into a melt and injected into a mold in the way that polyethylene normally perform. One viable method is the "one shot" approach, whereby all the reactants are combined simultaneously with injection into the mold. The alternative process calls for controlled synthesis of a prepolymer, i.e., a short chain polyurethane intermediate. The use of the intermediate provides a polyurethane which has generally better properties. The prepolymer method is generally more forgiving than the one shot approach, and hybrid techniques are possible, but the present art still has much room for improvements. This patent addresses the practical problem of prepolymer stability.

In particular, the present invention provides for treatment of polyols: this process involves the treatment of polyalkylene carbonate polyols, leading to more stable prepolymers and improved urethane products. Polyalkylene carbonate (PAC) polyols may be made by a base-catalyzed reaction, and some catalyst remains in the product PAC. Accordingly, the prior art has depended on residual acid species, e.g., HCl, in the TDI to neutralize the residual base species in the polyol. Where necessary, it is possible to add an acid chloride to the TDl (invariably benzoyl chloride) to provide for the neutralization; but the limitation on the prior art is that benzoyl chloride simply does not stabilize PAC prepolymers—even when added in large excess. Benzoyl chloride may prevent a runaway exothermic reaction, but even so, it is just as objectionable as HCl for many applications because residual chloride ions remain in the product. Even further, benzoyl chloride does not provide a stable prepolymer. The present invention produces stable PAC prepolymers with the dual advantages of longer storage times (before fabrication) and longer gel times (during fabrication). Thus, premature curing does not occur, and the molded products have better physical properties, environmental resistance, etc.

DESCRIPTION OF THE PROCESS

The PAC polyol is typically a diol with an equivalent weight of about 250 to 2000, although triols are available. Addition of a strong acid to the PAC polyol neutralizes the residual base catalyst, preventing side reactions, including trimerization of the TDI.

Specifically, the PAC polyol requires initial characterization with respect to its "CPR" count. "CPR" represents the phrase "controlled polymerization rate," signifying the amount of residual base in the prepolymer. CPR determination protocol calls for 30 g. of PAC in 100 ml of methanol to be titrated with 0.01N HCl, where the ten times the acid volume is equal to the CPR value. See "Urethane Polyether Prepolymers and Foams: Influence of Chemical and Physical Variables on Reaction Behavior" by Schotten, Schuhmann, and TenHoor, in *J. Chem. Eng. Data*, Vol. 5, No. 3, July, 1960. The key is to achieve a negative CPR value by addition of the strong acid. But a CPR value below $-100$ would be unnecessary, possibly even counterproductive and detrimental to the product.

The strong acids used here include methanesulfonic acid (MSA) and para-toluenesulfonic acid (PTSA). Certainly many other strong acids will also work, but each acid type should be tested experimentally—not to verify its ability to clean up the PAC polyol, but rather to determine whether unwanted side reactions also occur. For example, as suggested earlier, HCl has been found to be an undesirable acid. But it is equally clear that virtually any organosulfonic acid will perform satisfactorily.

Furthermore, some acids react directly with TDI, e.g., $H_2SO_4$ and PTSA; so it is necessary to treat the PAC polyol with the acid prior to its reaction with a polyisocyanate.

The process involves mixing an acid with a selected polyol, more particularly with PAC, either before or after it is reacted with a polyisocyanate to form a prepolymer. The mixing procedure is best carried out at about 60° F. to about 95° F., in an closed container. The acid is added to the PAC with stirring. The acid is stirred into the PAC using, for laboratory amounts, a stirring device, to mix acid. The amount of acid is quite small; as an example, for one liter of PAC, acid is added with stirring in an effective amount of just a few ppm, or only a few drops. Since only a small amount of acid is needed, a neutral diluent (preferably the PAC polyol itself) is added to the acid, perhaps 10 to 50 to one of acid. The acid is added over time with stirring. If the residual base species in the PAC is known before treatment, the amount of acid can be calculated. On the other hand, acid can be ratably added to achieve base neutralization over time to avoid excessive over dosing.

Therefore, the preferred procedure is adding acid while stirring the PAC until the requisite neutralization is accomplished. This extent of acid addition varies primarily with the degree of PAC neutralization. Should insufficient acid be added, the step is repeated until a negative CPR value is obtained.

Table I shows the inefficacy of benzoyl chloride as a stabilizer. A PAC polyol was reacted with toluene diisocyanate to form a prepolymer having an isocyanate content of 5%. The prepolymer CPR values were found according to the procedure mentioned above. Viscosity of the prepolymer after treatment is given in centipoises, as measured with a Brookfield Viscometer Model RVTD. This machine is rotational viscometer containing various spindles, previously calibrated by the manufacturer. The spindle is placed in the solution to be analyzed and rotated. The viscosity is calculated by multiplying the RPM by the appropriate spindle calibration factor.

TABLE I

| PREPOLYMER CPR | PREPOLYMER VISCOSITY (cp) | TIME BEFORE GELATION |
|---|---|---|
| 1.76 | | instantaneous |
| 1.40 | 74,200 | 1 hour |
| 0.99 | 40,400 | 1 day |
| 0.006 | 33,000 | 1 day |
| −2.01 | 27,000 | 1–2 days |
| −4.98 | 24,000 | 1–2 days |
| −7.95 | 29,800 | 1–2 days |
| −13.89 | 41,200 | 1–2 days |
| −31.35 | 37,000 | 1–2 days |
| −61.41 | 26,800 | 1–2 days |

Various side reactions appear to have occurred, including trimerization of the isocyanate, resulting in gelation.

In a second test described in Table II, PTSA was used to treat a quantity of PAC. The treated PAC was then reacted with an excess of toluene diisocyanate to form a prepolymer containing 5% isocyanate groups. Measurements were taken after 24 hours at 80° C.

TABLE II

| CPR of PAC | PREPOLYMER RESULT |
|---|---|
| 5.2 | gelation |
| 1.2 | gelation |
| 0.2 | no gelation (still liquid) |
| −5.0 | no gelation (still liquid) |

The first two runs evidence trimerization with the TDI, while the two runs at lower CPR show stability of the prepolymer made with a properly treated PAC.

For a third test described in Table III, more quantitative data was obtained by measuring % NCO loss (a weight % of the prepolymer). The percentage value is found by carrying out a dibutylamine reaction, followed by back titration with HCl. Measurements were taken after 24 hours at 80° C.

TABLE III

| CPR of PAC | ACID | PREPOLYMER % NCO LOST |
|---|---|---|
| 6.0 | Benzoyl chloride | gelation |
| −10 | PTSA | 0.04 |
| −1.7 | MSA | 0.01 |

Treatment or neutralization of the polyol in the latter two cases was sufficient to stop virtually any trimerization of the prepolymer.

As shown from the foregoing tables, PAC polyol neutralization is accomplished to obtain a more useful prepolymer. While variations in the present process may be incorporated, the scope of the present disclosure is determined by the claims which follow.

What is claimed is:

1. A method of stabilizing a prepolymer prepared by the reaction of a PAC polyol and a polyisocynate comprising adding to the PAC polyol or the prepolymer prepared therefrom an organosulfonic acid suitable to stabilize the prepolymer in an amount sufficient to neutralize the PAC polyol.

2. The method of claim 1 wherein the addition of acid proceeds until a negative CPR is obtained.

3. The method of claim 2 wherein the acid is PTSA or MSA.

4. The method of claim 3 wherein the step of adding acid includes adding acid in ppm quantity and thereafter testing from CPR value until a negative CPR is measured.

5. The method of claim 4 wherein the acid is added with stirring of the prepolymer or PAC polyol is at a temperature of about 60° to about 95° F.

6. The method of claim 5 wherein stirring is done in a closed container.

7. The method of claim 6 wherein the acid is mixed with a diluent before addition to the PAC polyol.

8. A method of stabilizing a prepolymer prepared from a PAC polyol comprising adding to the PAC polyol or the prepolymer prepared therefrom an acid suitable to stabilize the prepolymer, in an amount sufficient to neutralize the PAC polyol.

9. The method of claim 8 wherein the addition of acid proceeds until a negative CPR is obtained.

10. The method of claim 8 wherein the acid is PTSA or MSA.

11. The method of claim 8 wherein acid is added with stirring to achieve base neutralization.

12. The method of claim 11 wherein the step of adding acid includes adding acid in ppm quantity and thereafter testing for CPR value until a negative CPR is measured.

13. The method of claim 12 wherein the acid is added with stirring of the prepolymeric or PAC polyol at a temperature of about 60° to about 95° F.

14. The method of claim 12 wherein stirring is done in a closed container.

15. The method of claim 12 wherein the acid is mixed with a diluent before addition to the PAC polyol.

16. The method of claim 12 wherein the acid is added in an effective amount of a few parts per million.

* * * * *